(12) United States Patent 
Gatlin

(10) Patent No.: US 12,623,327 B2 
(45) Date of Patent: May 12, 2026

(54) ADVANCED STRUT MARKER DEVICE FOR PRECISE MARKING ON MANUFACTURED STRUTS

(71) Applicant: Jimmie Gatlin, Port Neches, TX (US)

(72) Inventor: Jimmie Gatlin, Port Neches, TX (US)

( * ) Notice: Subject to any disclaimer, the term of this patent is extended or adjusted under 35 U.S.C. 154(b) by 402 days.

(21) Appl. No.: 18/304,334

(22) Filed: Apr. 20, 2023

(65) Prior Publication Data

US 2024/0278403 A1 Aug. 22, 2024

Related U.S. Application Data

(60) Provisional application No. 63/485,487, filed on Feb. 16, 2023.

(51) Int. Cl.
B25D 5/00 (2006.01)
B23Q 16/00 (2006.01)

(52) U.S. Cl.
CPC ............. B25D 5/00 (2013.01); B23Q 16/001 (2013.01)

(58) Field of Classification Search
CPC . B25D 5/00; B23Q 16/001; B26F 1/34; B26F 1/32; B21D 5/002; B21D 28/00
USPC .................................................... 33/520, 670
See application file for complete search history.

(56) References Cited

U.S. PATENT DOCUMENTS

| | | | | |
|---|---|---|---|---|
| 2,107,581 A | * | 2/1938 | Parsons ................. | B21D 28/34 |
| | | | | 83/698.31 |
| 2,500,420 A | * | 3/1950 | Koning ................. | B21D 28/34 |
| | | | | 279/76 |
| 2,580,930 A | * | 1/1952 | Kost ...................... | B21D 28/34 |
| | | | | 279/79 |
| 3,641,860 A | * | 2/1972 | Whistler, Sr. .......... | B21D 28/34 |
| | | | | 83/699.41 |
| 3,815,459 A | * | 6/1974 | Daniels ................ | B21D 28/243 |
| | | | | 83/559 |
| 3,863,341 A | * | 2/1975 | Ramer ................. | B21D 28/007 |
| | | | | 30/DIG. 4 |
| 4,007,653 A | * | 2/1977 | Cady .................... | B21D 45/006 |
| | | | | 83/684 |
| 5,025,691 A | * | 6/1991 | Deni ...................... | B21D 28/34 |
| | | | | 83/685 |
| 5,181,438 A | * | 1/1993 | Wellman ................ | B21D 28/34 |
| | | | | 72/482.91 |
| 5,382,102 A | * | 1/1995 | Brolund ................ | B44B 5/0076 |
| | | | | 83/552 |
| 8,459,161 B2 | * | 6/2013 | Moellering ............ | B21D 28/34 |
| | | | | 83/698.31 |
| 11,065,694 B2 | * | 7/2021 | Hartnagel ............. | B23B 45/003 |
| 11,667,051 B2 | * | 6/2023 | Morehead ................ | B26F 1/14 |
| | | | | 83/30 |

(Continued)

*Primary Examiner* — Peter J Macchiarolo
*Assistant Examiner* — Anna Josephine Saunders
(74) *Attorney, Agent, or Firm* — Eversheds-Sutherland (US) LLP

(57) ABSTRACT

This disclosure describes systems, methods, and devices for accurately locating the center mark for a center punch on a metal strut, which is commonly used to support cable trays and pipes in various industries. The device solves the problem of inaccurate center marking by using a center punch and a punch alignment guide. The guide sets the punch in a precise position, and by placing the device on the strut and pressing a button, a small indentation is made on the metal to mark the center point accurately. This ensures that drilling or cutting tools do not slip or wander and that holes or cuts are placed accurately.

20 Claims, 4 Drawing Sheets

(56)　　　　　References Cited

U.S. PATENT DOCUMENTS

| | | | |
|---|---|---|---|
| 2003/0200666 A1* | 10/2003 | Baker | B25D 5/00 |
| | | | 30/366 |
| 2004/0118177 A1* | 6/2004 | Hsieh | H01R 43/0427 |
| | | | 72/453.16 |
| 2011/0185874 A1* | 8/2011 | Blair | B21D 28/243 |
| | | | 83/685 |
| 2016/0228936 A1* | 8/2016 | Villeneuve | B26F 1/14 |
| 2017/0197254 A1* | 7/2017 | Belt | F16N 7/00 |
| 2019/0224758 A1* | 7/2019 | Hartnagel | B25H 1/0078 |
| 2019/0262898 A1* | 8/2019 | Menzel | B30B 11/005 |
| 2019/0270143 A1* | 9/2019 | Duginske | B25B 5/006 |
| 2024/0278403 A1* | 8/2024 | Gatlin | B25D 5/00 |

* cited by examiner

ADVANCED STRUT MARKER DEVICE FOR PRECISE MARKING ON MANUFACTURED STRUTS

CROSS-REFERENCE TO RELATED PATENT APPLICATION(S)

This application claims the benefit of U.S. Provisional Application No. 63/435,487, filed Dec. 27, 2022, the disclosure of which is incorporated by reference as set forth in full.

TECHNICAL FIELD

This disclosure pertains to the field of metalworking, structural components, and mechanical tools. More specifically, it addresses the challenge of locating the precise position on metal struts before performing drilling, cutting, or other machining operations by creating a small indentation or starting point on the metal or other materials.

BACKGROUND

Specialized center punches are available in the market for various applications or materials, such as leatherworking or glass etching. However, there are limited options for center punches specifically designed for metal surfaces.

BRIEF DESCRIPTION OF THE DRAWINGS

In order to fully understand the embodiments in this disclosure, reference is made to the accompanying drawings. The disclosure describes aspects and embodiments in the following description, with reference to the drawings or figures (FIG.) in which numbers represent the same or similar elements. It is understood that these drawings are not intended to be limiting, but rather to describe the various embodiments with additional detail through the use of accompanying drawings.

DETAILED DESCRIPTION

Figure 1:
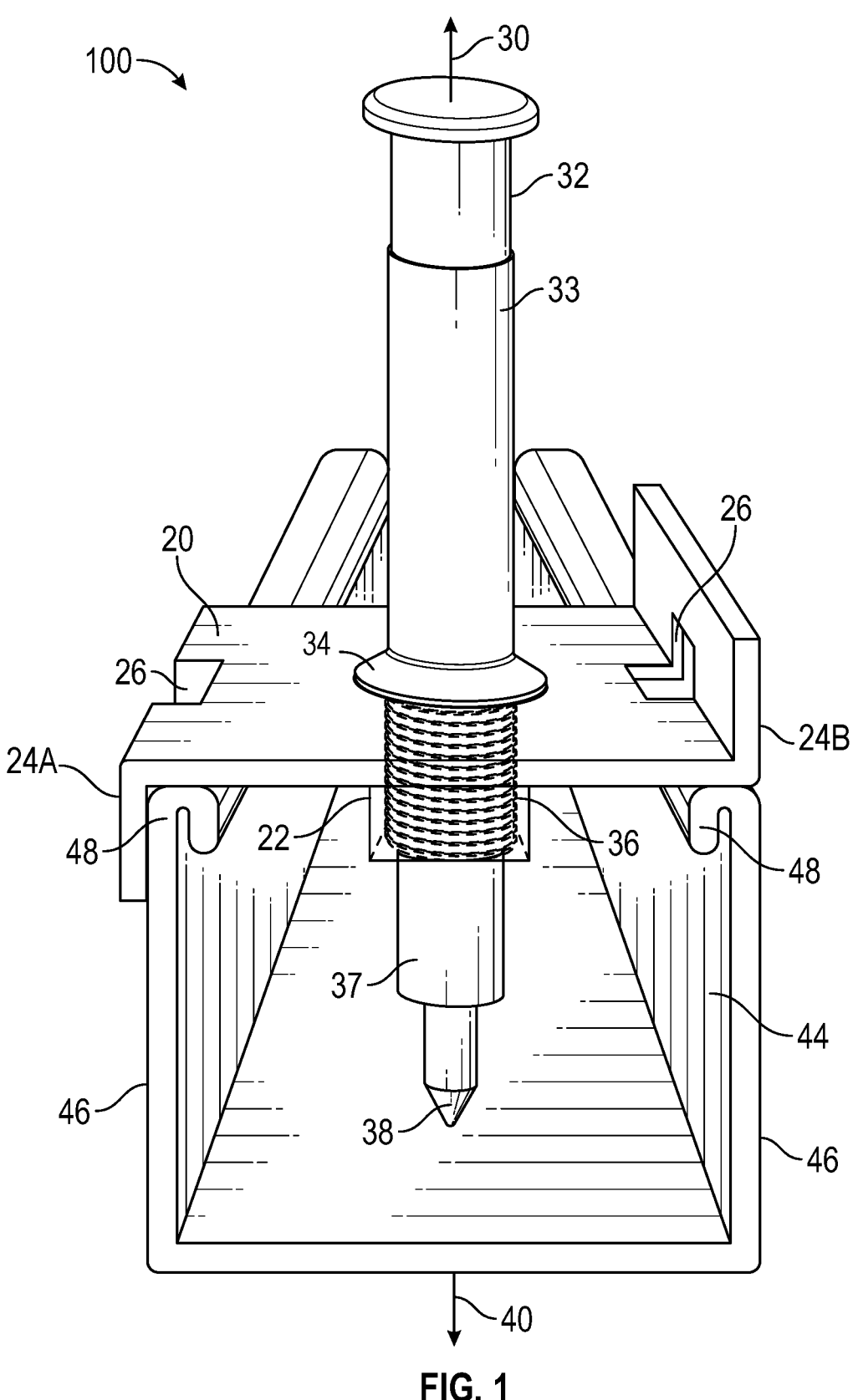
FIG. 1 shows a device assembly, comprising a center punch and punch alignment guide, in an upright position on a single strut, in accordance with one or more example embodiments of the present disclosure.

In the following description, numerous specific details are set forth to provide a thorough understanding of various embodiments. However, one skilled in the relevant art will recognize that the embodiments described herein can be practiced without one or more specific details or with other methods, components, materials, etc. In other instances, well-known structures, materials, or operations are not shown or described in detail to avoid obscuring certain aspects.

The two most common types of metal center punches are the Standard Center Punch and Automatic Center Punch. The former is a basic punch used for making small marks on metal surfaces with a hammer, while the latter has a spring-loaded mechanism that creates an indentation automatically. However, both types of punches require a measuring tape to locate the center mark, resulting in less precise results. Thus, there is a need for a device that creates consistent marks and reduces the risk of injury or fatigue from hammering, without the need for a measuring tape. Such a device ensures accurate and precise results before using any cutting or drilling tools.

In accordance with various embodiments, this disclosure presents a device and method that can effectively and accurately locate the center mark for a center punch on struts, whether single or double strut. Struts find widespread use in various industries, including construction, manufacturing, and utilities, to support cable trays and pipes. They can be made of different materials, such as steel, aluminum, and fiberglass. The metal strut marker device and method can solve the challenges mentioned above by carefully measuring and marking the metal before using cutting or drilling tools, resulting in precise and accurate results. The various embodiments cover at least two parts-a center punch and a punch alignment guide. The punch alignment guide sets the punch in a precise position for making indentations. For instance, by placing the metal strut marker device on the strut and sliding it left or right and pressing the button, the center mark and precise punch location can be marked on the metal by creating a small indentation or starting point. This indentation helps prevent the drill or cutting tool from slipping or wandering and ensures accurate placement of the hole or cut.

The following describes various embodiments of the present technology that illustrate interesting aspects. Generally, embodiments can combine the described aspects in any way. All statements herein relating to principles, aspects, and embodiments are intended to include both structural and functional equivalents. Additionally, such equivalents are intended to include both currently known equivalents and equivalents developed in the future, i.e. any elements developed that perform the same function, regardless of structure.

It is noted that, as used herein, the singular forms "a," "an" and "the" include plural referents unless the context clearly dictates otherwise. Reference throughout this specification to "one," "an," "certain," "various," and "cases", "embodiments" or similar language means that a particular aspect, feature, structure, or characteristic described in connection with the embodiment is included in at least one embodiment. Thus, appearances of the phrases "in one case," "in at least one embodiment," "in an embodiment," "in certain cases," and similar language throughout this specification may, but do not necessarily, all refer to the same embodiment or similar embodiments. Furthermore, aspects and embodiments described herein are merely by way of example, and should not be construed as limiting of the scope or spirit of the disclosure as appreciated by those of ordinary skill in the art. The various embodiment are used and include various novel aspect described herein. Furthermore, to the extent that the terms "including", "includes", "having", "has", "with", or variants thereof are used in either the detailed description and the claims, such terms are intended to be inclusive in a similar manner to the term "comprising." In embodiments showing multiple similar elements, such as storage devices, even if using separate reference numerals, some such embodiments may work with a single element filling the role of the multiple similar elements.

Referring now to FIG. 1, there is shown an embodiment that includes a punch alignment guide used in conjunction with a center punch to create precise markings on a material. The punch alignment guide comprises a plate 20 with a pair of opposing flanges 24A and 24B extending perpendicularly from the plate 20. The base plate 20 further includes a centrally located hole with a diameter of about one-half inch, and a threaded insert 22 is affixed within this hole. As an example, the punch alignment guide includes the plate 20 that is approximately two inches wide, 1¼ inches long, and ⅛ inch thick, with two folded flanges 24A and 24B on each end. These flanges are oriented in opposite directions to create a symmetrical shape with two raised edges, providing a stable and robust platform for the punch alignment guide. The plate 20, along with its folded plate flanges 24A and 24B, forms a single unit that can be positioned on top of the strut's flanges 48, with matched dimensions to ensure a seamless fit during assembly. The plate 20 features a centrally located hole with a diameter of one-half inch, where a female thread cylinder 22 is affixed. Additionally, the punch alignment guide includes one centered notch 26 on each folded plate flange (24A and 24B), allowing for precise markings to be made at evenly spaced intervals. The dimensions mentioned here are just an example, and the base plate 20 can be designed in different sizes and shapes to cater to the specific requirements of different applications and user preferences. In accordance with one embodiment, the center punch comprises several components, including a punch handle 30, metallic tubing 32, cylinder 33, washer 34, threaded cylinder 36 with male threads, piston cylinder 37, and steel tip 38, which are configured to cooperatively deliver precise punching capabilities.

The punch handle 30 constitutes the portion of the center punch grasped by the user and has dimensions of approximately ½ inch in width and ⅛ inch in thickness.

The metallic tubing 32 is affixed to the punch handle 30, featuring a length of approximately ¼ inch and an interior diameter of approximately ⅜ inch.

A cylinder 33 with a length of approximately one inch and an outer diameter of approximately ⅜ inch is coupled to the metallic tubing 32 and functions as the primary body of the center punch.

A washer 34, having a diameter of approximately ¾ inch, is securely bonded to the cylinder 33 to facilitate the even distribution of the punching force.

The threaded cylinder 36 comprises male threads, an interior diameter of approximately ½ inch, and a length of approximately ⅜ inch. The threaded cylinder 36 is welded to a piston cylinder 37 with an outer diameter of approximately ⅜ inch and a length of about 1⅛ inches on one side, and to the washer 34 on the other side. The threaded cylinder 36 enables the user to secure or detach the punch from the punch alignment guide.

A steel tip 38, with a length of approximately ⅛ inch, is connected to the piston cylinder 37 and is responsible for delivering precision punching.

Collectively, these components create a center punch designed for precision, durability, and optimal performance, utilizing a combination of steel and metallic tubing to ensure both strength and accuracy.

Figure 2:
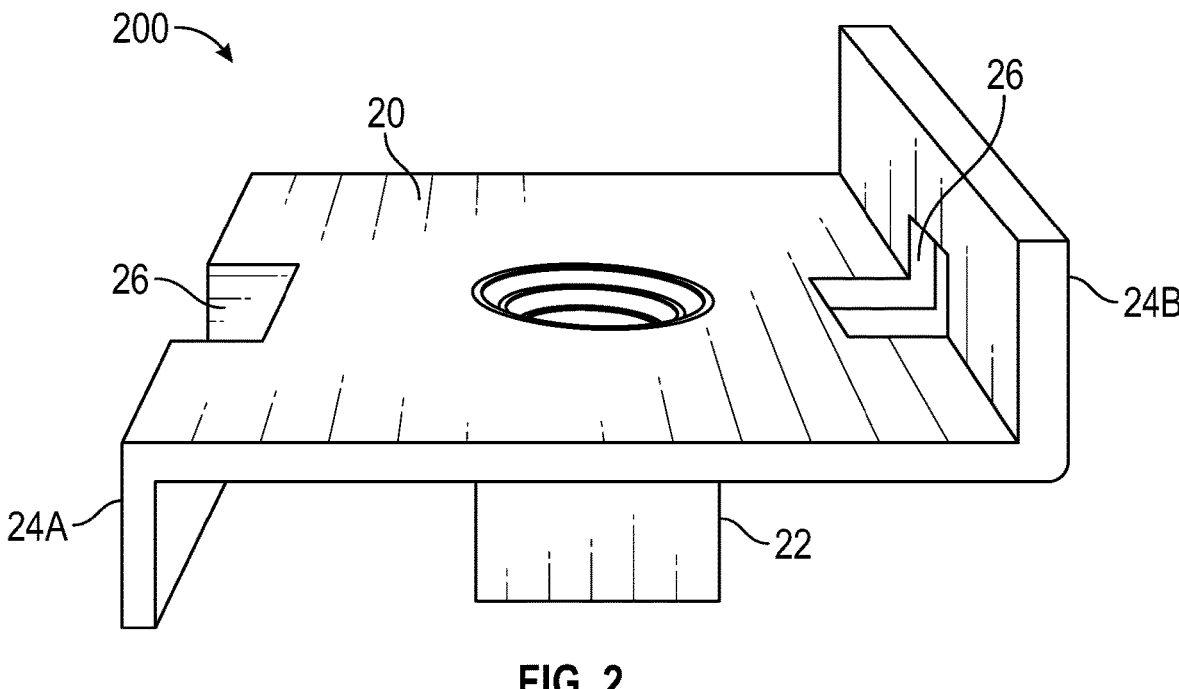
FIG. 2 shows a device assembly including the punch alignment guide without the center punch described herein, in accordance with one or more example embodiments of the present disclosure.

Referring to FIG. 2, one embodiment of the punch alignment guide without the center punch is illustrated. The punch alignment guide comprises a plate 20 with two folded flanges 24A and 24B, a female thread cylinder 22, and a centered notch 26 on each folded plate flange 24A and 24B.

The plate 20 serves as the main body of the punch alignment guide and includes a centrally located hole for attaching the center punch. The plate is also characterized by two folded flanges, 24A and 24B, situated at each end and oriented in opposite directions, thus forming a symmetrical shape with two raised edges.

The female thread cylinder 22 is secured to the hole in the plate 20 and functions to attach the center punch.

The punch alignment guide is equipped with a centered notch 26 on each folded plate flange (24A and 24B). These notches facilitate the creation of precise markings at evenly spaced intervals, thereby ensuring accuracy in the resulting product.

In summary, the punch alignment guide is designed to operate in conjunction with the center punch to produce precise markings on a material. The synergy between these two tools guarantees accuracy and consistency in the markings, rendering them valuable for a wide range of applications.

Figure 3:
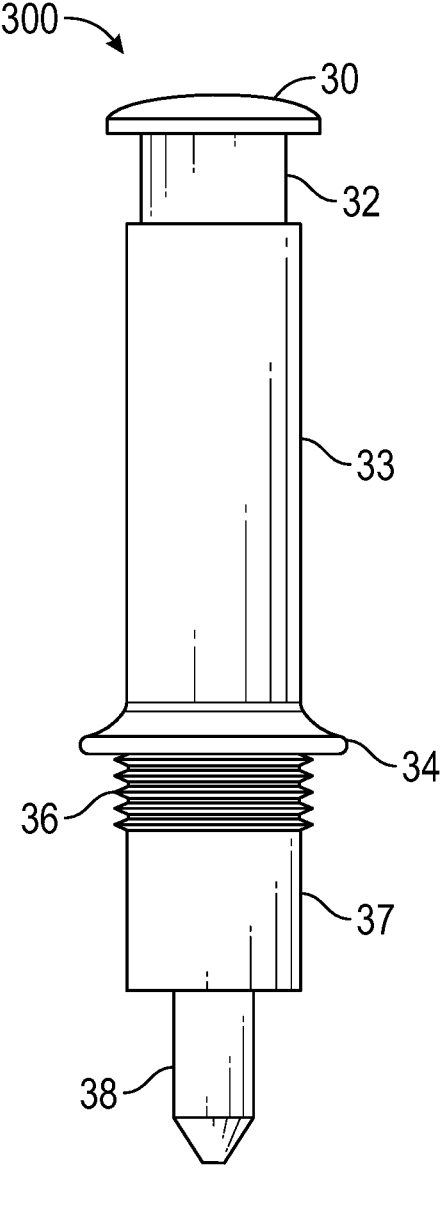
FIG. 3 shows a device assembly including the center punch in an upright position, without the punch alignment guide described herein, in accordance with one or more example embodiments of the present disclosure.

Referring to FIG. 3, the center punch in an upright position without the punch alignment guide is depicted. The center punch consists of a punch handle 30 connected to metallic tubing 32. It also incorporates a cylinder 33 with a washer 34 bonded to it. Furthermore, a threaded cylinder 36 featuring male threads is welded to piston cylinder 37 on one side and washer 34 on the other. The threaded cylinder 36 enables the punch to be locked or unscrewed from the punch alignment guide, while the steel tip offers precision punching.

Figure 4:
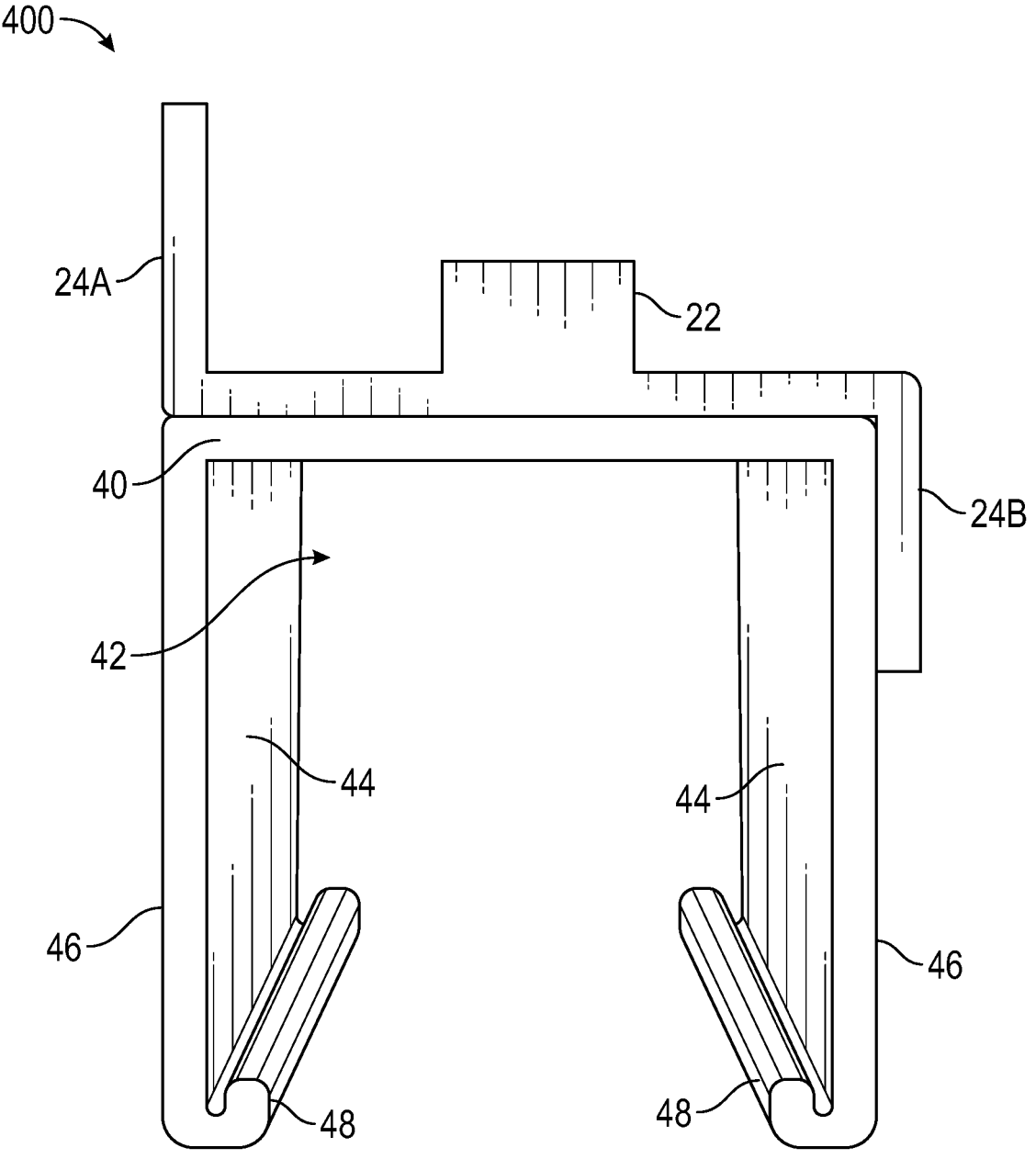
FIG. 4 shows a device assembly including the punch alignment guide in a reverse position on the back of a single strut without the center punch described herein, in accordance with one or more example embodiments of the present disclosure.

Turning to FIG. 4, the usage of the punch alignment guide on the back surface of a single strut without the center punch is displayed. A single strut comprises several components, including: Strut channels 42, which are open spaces inside the strut for mounting other components or fixtures; back surface 40, which refers to the side of the strut opposite the channels; channel walls 44, which are surfaces enclosing the channels within the strut; exterior surfaces of the strut 46, which refer to the visible and accessible outer parts of the strut; and strut flanges 48, which are formed by folding the end of the strut over itself to create a double-thickness flange, providing increased rigidity and strength.

To mark or indent the exterior or back surfaces of the strut, the center punch should be removed, and the punch alignment guide must be flipped and positioned on the desired surfaces such that the female thread cylinder 22 faces upward. Then, using a pen or marker, the locations where drilling or punching is required can be marked. This process ensures that the markings are precise and consistent and can be applied to mark any surface of the strut as needed.

A mechanical system comprising one or more components can be configured to perform particular operations or actions by virtue of having mechanical parts, controllers, sensors, or a combination of them installed on the system that in operation causes or cause the system to perform the actions. One or more mechanical programs can be configured to perform particular operations or actions by virtue of including instructions that, when executed by the mechanical apparatus, cause the apparatus to perform the actions.

One general aspect includes a punch alignment guide including: The punch alignment guide also includes a plate having two folded flanges on each end, oriented in opposite directions, forming a symmetrical shape with two raised edges for positioning on a strut; and a centrally located hole with an affixed female thread cylinder. The guide also includes a center punch including: a punch handle; a metallic tubing; a cylinder; a washer bonded to the cylinder for distributing the force of the punch evenly; a threaded cylinder with male threads welded to a piston cylinder on one side and the washer on the other side, allowing the center punch to be locked or unscrewed from the punch alignment guide; and a steel tip attached to the piston cylinder for creating precise markings on a material. Other embodiments of this aspect include corresponding computer systems, apparatus, and computer programs recorded on one or more computer storage devices, each configured to perform the actions of the methods.

Implementations may include one or more of the following features. The device where the strut may include a single or double strut. The strut is made of aluminum or galvanized materials. The punch alignment guide and center punch are made of aluminum. The threaded cylinder with male threads is replaceable with a non-threaded cylinder. The female thread cylinder affixed to the center of the plate is replaceable with a non-threaded cylinder. The punch alignment guide includes one or more markings or indicia for aligning the device with the material to be marked. The plate of the punch alignment guide is made of a durable material resistant to deformation during repeated use. The metallic tubing of the center punch is made of a lightweight material. The steel tip of the center punch is replaceable to accommodate different tip sizes and shapes for marking various materials. The device may include a depth adjustment mechanism for controlling the depth of the marking made by the steel tip of the center punch. The device may include a locking mechanism for preventing accidental removal of the center punch from the punch alignment guide during use. The plate of the punch alignment guide is detachable, allowing for different plates with various hole sizes or shapes to be used. The punch alignment guide is secured using a push pin as an alternative to the female thread cylinder. Implementations of the described techniques may include hardware, a method or process, or computer software on a computer-accessible medium.

One general aspect includes a system for creating precise markings on a material a punch alignment guide, including: a plate having two folded flanges on each end of the plate which are oriented in opposite directions, creating a symmetrical shape with two raised edges to position on a strut, and a centrally located hole with a female thread cylinder that is affixed to this hole; and a center punch, including: a punch handle, a metallic tubing, a cylinder, a washer, a threaded cylinder with male threads, a piston cylinder, and a steel tip, where the punch handle is attached to the metallic tubing that is attached to the cylinder and the cylinder has a washer bonded to it to distribute the force of the punch evenly, and the threaded cylinder with male threads is welded to the piston cylinder on one side and the washer on the other side to lock or unscrew the center punch from the punch alignment guide, and the steel tip is attached to the piston cylinder to create precise markings on a material. The system is configured to allow for precise placement of the center punch using the punch alignment guide to create accurate markings on the material. Other embodiments of this aspect include corresponding computer systems, apparatus, and computer programs recorded on one or more computer storage devices, each configured to perform the actions of the methods.

Implementations may include one or more of the following features. The system may include a depth stop, where the depth stop is configured to limit the depth of the marking created by the steel tip of the center punch. The punch alignment guide further may include a pair of alignment pins, where the alignment pins are configured to align the punch alignment guide with the material. Implementations of the described techniques may include hardware, a method or process, or computer software on a computer-accessible medium.

One general aspect includes a method for creating precise markings on a material. The method also includes positioning a punch alignment guide on the material to be marked, where the punch alignment guide includes a plate with two folded flanges oriented in opposite directions, forming a symmetrical shape with two raised edges for positioning on a strut, and a centrally located hole with an affixed female thread cylinder; inserting a center punch into the punch alignment guide, where the center punch includes a punch handle, a metallic tubing, a cylinder, a washer bonded to the cylinder for distributing the force of the punch evenly, a threaded cylinder with male threads welded to a piston cylinder on one side and the washer on the other side, allowing the center punch to be locked or unscrewed from the punch alignment guide, and a steel tip attached to the piston cylinder for creating precise markings on the material; aligning the steel tip of the center punch at a desired marking location on the material; applying force to the punch handle of the center punch, causing the steel tip to create a precise marking on the material; and removing the center punch from the punch alignment guide. Other embodiments of this aspect include corresponding computer systems, apparatus, and computer programs recorded on one or more computer storage devices, each configured to perform the actions of the methods.

Implementations may include one or more of the following features. The method may include the step of adjusting the depth of the marking created by the steel tip by using a depth stop. The method may include the step of limiting the lateral movement of the material during the marking process by using a pair of adjustable stops on the punch alignment guide. Implementations of the described techniques may include hardware, a method or process, or computer software on a computer-accessible medium.

What is claimed is:

1. A device for marking a material, comprising:
   a punch alignment guide including:
       a plate having two folded flanges on each end, oriented in opposite directions, forming a symmetrical shape with two raised edges for positioning on a strut; and
       a centrally located hole with an affixed female thread cylinder;
   a center punch including:
       a punch handle;
       a metallic tubing;
       a cylinder;
       a washer bonded to the cylinder for distributing the force of the punch evenly;
       a threaded cylinder with male threads welded to a piston cylinder on one side and the washer on the other side, allowing the center punch to be locked or unscrewed from the punch alignment guide; and
       a steel tip attached to the piston cylinder for creating precise markings on a material, wherein, when placed on the strut, the opposing folded flanges engage opposite strut edges to prevent lateral movement, and wherein, when the center punch is tightened into the female thread cylinder, the center punch is held in a fixed vertical orientation relative to the plate during marking.

2. The device of claim 1, wherein the strut comprises a single or double strut.

3. The device of claim 1, wherein the strut is made of aluminum or galvanized materials.

4. The device of claim 1, wherein the punch alignment guide and center punch are made of aluminum.

5. The device of claim 1, wherein the threaded cylinder with male threads is replaceable with a non-threaded cylinder.

6. The device of claim 1, wherein the female thread cylinder affixed to the center of the plate is replaceable with a non-threaded cylinder.

7. The device of claim 1, wherein the punch alignment guide includes one or more markings or indicia for aligning the device with the material to be marked.

8. The device of claim 1, wherein the plate of the punch alignment guide is made of a durable material resistant to deformation during repeated use.

9. The device of claim 1, wherein the metallic tubing of the center punch is made of a lightweight material.

10. The device of claim 1, wherein the steel tip of the center punch is replaceable to accommodate different tip sizes and shapes for marking various materials.

11. The device of claim 1, further comprising a depth adjustment mechanism for controlling the depth of the marking made by the steel tip of the center punch.

12. The device of claim 1, further comprising a locking mechanism for preventing accidental removal of the center punch from the punch alignment guide during use.

13. The device of claim 1, wherein the plate of the punch alignment guide is detachable, allowing for different plates with various hole sizes or shapes to be used.

14. The device of claim 13, wherein the punch alignment guide is secured using a push pin as an alternative to the female thread cylinder.

15. A system for creating precise markings on a material, comprising:

a punch alignment guide, including:

a plate having two folded flanges on each end of the plate which are oriented in opposite directions, creating a symmetrical shape with two raised edges to position on a strut, and a centrally located hole with a female thread cylinder that is affixed to this hole; and a center punch, including:

a punch handle, a metallic tubing, a cylinder, a washer, a threaded cylinder with male threads, a piston cylinder, and a steel tip, wherein the punch handle is attached to the metallic tubing that is attached to the cylinder and the cylinder has a washer bonded to it to distribute the force of the punch evenly, and the threaded cylinder with male threads is welded to the piston cylinder on one side, and the washer on the other side to lock or unscrew the center punch from the punch alignment guide, and the steel tip is attached to the piston cylinder to create precise markings on a material, and wherein, when the punch alignment guide is positioned on the strut, the opposing folded flanges engage opposite edges of the strut to prevent lateral movement of the punch alignment guide, and wherein, when the threaded cylinder is tightened into the female thread cylinder, the center punch is secured in a fixed vertical orientation relative to the punch alignment guide during marking.

16. The system of claim 15, further comprising a depth stop, wherein the depth stop is configured to limit the depth of the marking created by the steel tip of the center punch.

17. The system of claim 15, wherein the punch alignment guide further comprises a pair of alignment pins, wherein the alignment pins are configured to align the punch alignment guide with the material.

18. A method for creating precise markings on a material, the method comprising the steps of:

positioning a punch alignment guide on the material to be marked, wherein the punch alignment guide includes a plate with two folded flanges oriented in opposite directions, forming a symmetrical shape with two raised edges for positioning on a strut, and a centrally located hole with an affixed female thread cylinder;

inserting a center punch into the punch alignment guide, wherein the center punch includes a punch handle, a metallic tubing, a cylinder, a washer bonded to the cylinder for distributing the force of the punch evenly, a threaded cylinder with male threads welded to a piston cylinder on one side and the washer on the other side, allowing the center punch to be locked or unscrewed from the punch alignment guide, and a steel tip attached to the piston cylinder for creating precise markings on the material;

aligning the steel tip of the center punch at a desired marking location on the material;

applying force to the punch handle of the center punch, causing the steel tip to create a precise marking on the material; and removing the center punch from the punch alignment guide, wherein, when the punch alignment guide is positioned on the strut, the opposing folded flanges engage opposite edges of the strut to prevent lateral movement of the punch alignment guide, and wherein, when the threaded cylinder is tightened into the female thread cylinder, the center punch is secured in a fixed vertical orientation relative to the punch alignment guide during marking.

19. The method of claim 18, further comprising the step of adjusting the depth of the marking created by the steel tip by using a depth stop.

20. The method of claim 18, further comprising the step of limiting the lateral movement of the material during the marking process by using a pair of adjustable stops on the punch alignment guide.

* * * * *